(12) United States Patent
Pokharna et al.

(10) Patent No.: US 6,906,919 B2
(45) Date of Patent: Jun. 14, 2005

(54) TWO-PHASE PUMPED LIQUID LOOP FOR MOBILE COMPUTER COOLING

(75) Inventors: Himanshu Pokharna, San Jose, CA (US); Eric DiStefano, Livermore, CA (US); James G. Maveety, San Jose, CA (US); Ravi Prasher, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 10/676,564

(22) Filed: Sep. 30, 2003

(65) Prior Publication Data

US 2005/0068724 A1 Mar. 31, 2005

(51) Int. Cl.[7] .............................................. G06F 1/20
(52) U.S. Cl. ...................... 361/687; 361/700; 165/86; 174/15.2
(58) Field of Search ................................ 361/699–700, 361/709, 719, 679–687; 165/80.3, 104.33, 104.34, 82.86; 174/15.2, 16.3; 710/303, 304

(56) References Cited

U.S. PATENT DOCUMENTS

| 6,288,895 B1 | * | 9/2001 | Bhatia ........................ 361/687 |
| 6,338,257 B1 | * | 1/2002 | Chiu et al. ..................... 62/305 |
| 6,795,311 B2 | * | 9/2004 | Pokharna et al. ........... 361/687 |

* cited by examiner

*Primary Examiner*—Hung Van Duong
(74) *Attorney, Agent, or Firm*—Blakely, Sokoloff, Taylor & Zafman LLP

(57) ABSTRACT

According to one embodiment of the present invention, a cooling apparatus for notebook computer systems is disclosed. The apparatus includes: an evaporator coupled to a heat generating device to extract the generated heat away from the device, the device being installed inside a notebook computer, a heat exchanger coupled to the evaporator; a transport medium to flow inside the evaporator and the heat exchanger to transfer the generated heat from the device to the heat exchanger; and a pump attached to the evaporator and the heat exchanger to force the transport medium between the evaporator and the heat exchanger.

30 Claims, 6 Drawing Sheets

TWO-PHASE PUMPED LIQUID LOOP FOR MOBILE COMPUTER COOLING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of cooling electronic devices. More particularly, an embodiment of the present invention relates to two-phase pumped liquid loop for mobile computer cooling.

BACKGROUND

Notebook (also called laptop) computers are lightweight personal computers, which are quickly gaining popularity. The popularity of the notebook computers has especially increased since their prices have been dropping steadily. One clear advantage of notebook computers is their ease of portability.

Notebook computers, however, fail to provide comparable performance to their larger siblings (i.e., desktop computers or workstations). One reason for this lower performance level is that notebook computers are harder to cool. For example, a large fan will draw too much power from the battery. Size is also an issue, which needs to be considered in portable applications. A large fan may be infeasible because it requires too much space. Furthermore, users frequently operate their notebook computers on their laps (hence, notebook computers are also called laptop computers). This use limits the amount of heat that may be generated or present in a notebook computer.

As more functionality is integrated into mobile computing platforms, the need to increase heat dissipation becomes increasingly important. Furthermore, users expect increasingly more computing power in mobile computing platforms, furthering the need for creative cooling solutions. Mobile computer designers have responded by implementing cooling solutions such as installing cooling fans in notebooks and reducing heat generation by, for example, reducing processor and chipset clock speeds, intermittently disabling unused components, and reducing power required by display devices, such as a liquid crystal display (LCD) or "flat panel" display (which generally results in dimmer screens that are hard to read).

Moreover, heat sinks, fans, and heat pipes are typically employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Accordingly, the current solutions fail to address the cooling requirements associated with utilizing faster components in notebook computers, which may dissipate a large amount of heat.

BRIEF DESCRIPTION OF THE DRAWINGS

The invention is illustrated by way of example and not limitation in the figures of the accompanying drawings, in which like references indicate similar or identical elements and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
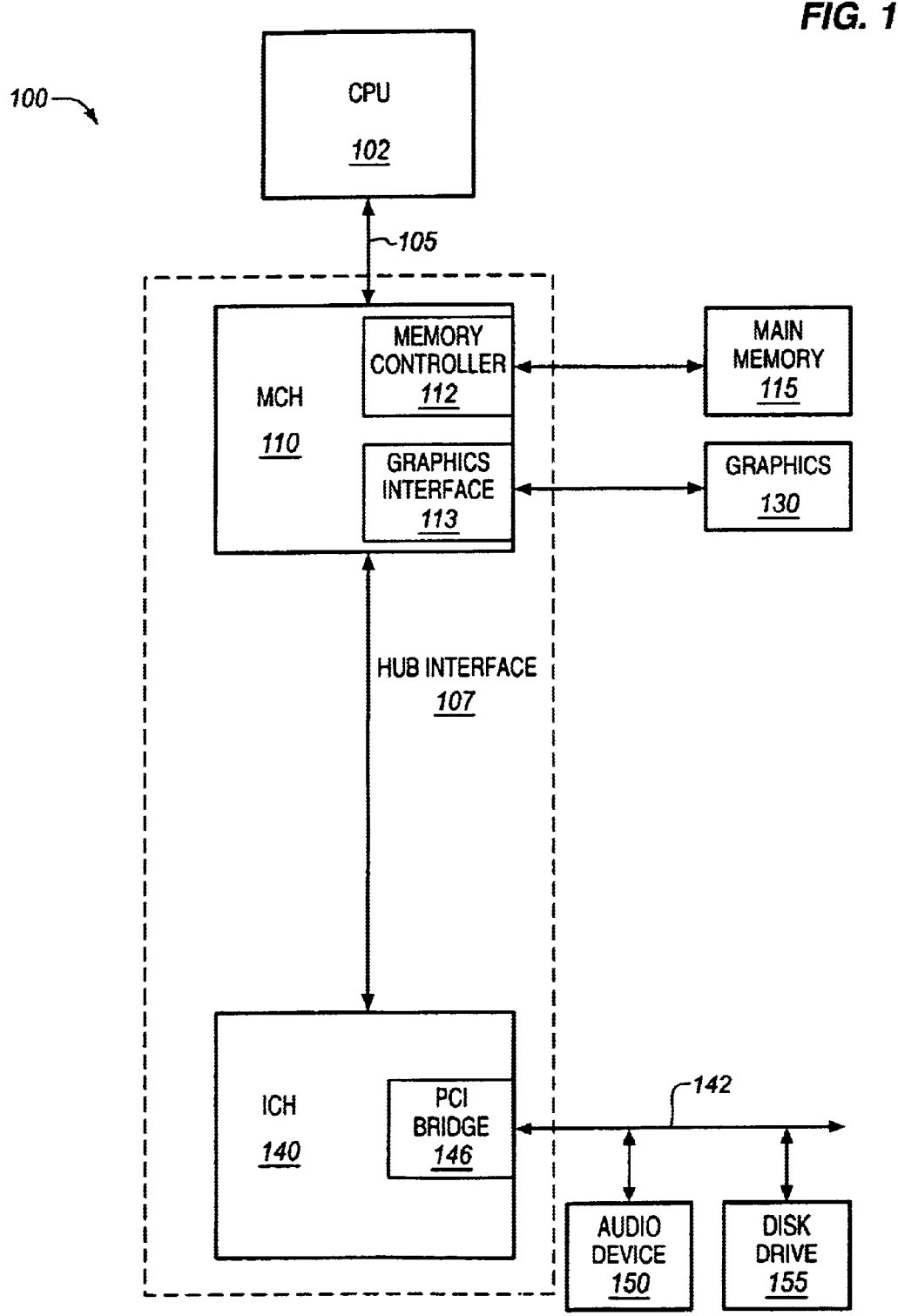
FIG. 1 illustrates an exemplary block diagram of a computer system 100 which may be utilized to implement embodiments of the present invention.

FIG. 1 illustrates an exemplary block diagram of a computer system 100 which may be utilized to implement embodiments of the present invention. The computer system 100 includes a central processing unit (CPU) 102 coupled to a bus 105. In one embodiment, the CPU 102 is a processor in the Pentium® family of processors including the Pentium® II processor family, Pentium® processors, Pentium® IV processors available from Intel Corporation of Santa Clara, Calif. Alternatively, other CPUs may be used, such as Intel's XScale processor, Intel's Pentium M Processors, ARM processors available from ARM Ltd. of Cambridge, the United Kingdom, or OMAP processor (an enhanced ARM-based processor) available from Texas Instruments, Inc., of Dallas, Tex.

A chipset 107 is also coupled to the bus 105. The chipset 107 includes a memory control hub (MCH) 110. The MCH 110 may include a memory controller 112 that is coupled to a main system memory 115. Main system memory 115 stores data and sequences of instructions that are executed by the CPU 102 or any other device included in the system 100. In one embodiment, main system memory 115 includes dynamic random access memory (DRAM); however, main system memory 115 may be implemented using other memory types. Additional devices may also be coupled to the bus 105, such as multiple CPUs and/or multiple system memories.

The MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In an embodiment of the present invention, a flat panel display may be coupled to the graphics interface 113 through, for example, a signal converter that translates a digital representation of an image stored in a storage device such as video memory or system memory into display signals that are interpreted and displayed by the flat-panel screen. It is envisioned that the display signals produced by the display device may pass through various control devices before being interpreted by and subsequently displayed on the flat-panel display monitor.

In addition, the hub interface couples the MCHI 110 to an input/output control hub (ICH) 140 via a hub interface. The ICH 140 provides an interface to input/output (I/O) devices within the computer system 100. The ICH 140 may be coupled to a Peripheral Component Interconnect (PCI) bus adhering to a Specification Revision 2.1 bus developed by the PCI Special Interest Group of Portland, Oreg. Thus, the ICH 140 includes a PCI bridge 146 that provides an interface to a PCI bus 142. The PCI bridge 146 provides a data path between the CPU 102 and peripheral devices.

The PCI bus 142 includes an audio device 150 and a disk drive 155. However, one of ordinary skill in the art will appreciate that other devices may be coupled to the PCI bus 142. In addition, one of ordinary skill in the art will recognize that the CPU 102 and MCH 110 could be combined to form a single chip. Furthermore, graphics accelerator 130 may be included within MCH 110 in other embodiments.

In addition, other peripherals may also be coupled to the ICH 140 in various embodiments. For example, such peripherals may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, the computer system 100 is envisioned to receive electrical power from one or more of the following sources for its operation: a battery, alternating current (AC) outlet (e.g., through a transformer and/or adaptor), automotive power supplies, airplane power supplies, and the like. In one embodiment of the present invention, a cooling system may be coupled to the CPU 102 to remove heat therefrom. Other embodiments may include systems that may be configured differently than the computer system 100.

Figure 2:
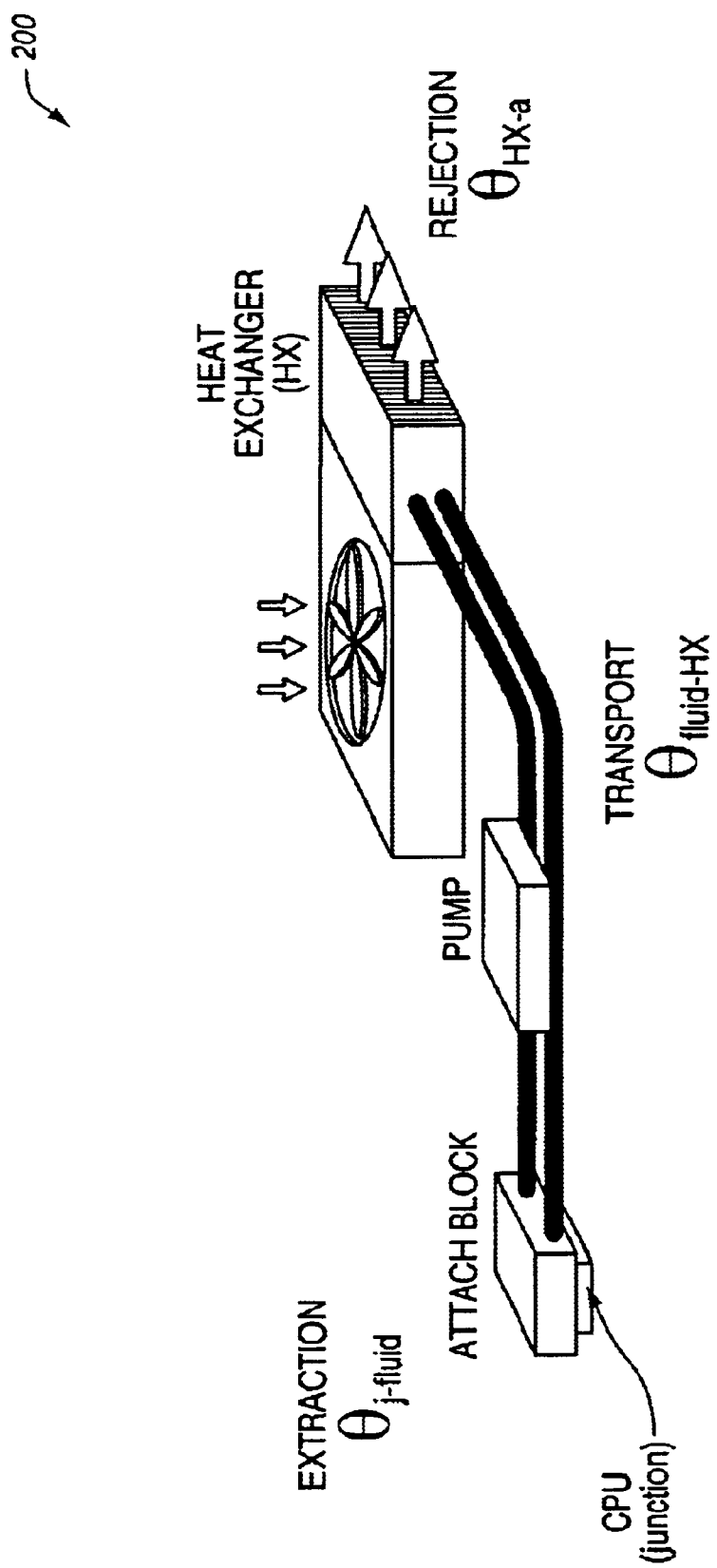
FIG. 2 illustrates an exemplary block diagram of a cooling system 200 in accordance with an embodiment of the present invention.

FIG. 2 illustrates an exemplary block diagram of a cooling system 200 in accordance with an embodiment of the present invention. The cooling system 200 includes three stages. The three stages are extraction, transport, and rejection. The rejection stage includes a heat exchanger 202. The heat exchanger may include a fan 204 in an embodiment of the present invention to provider higher airflow. The transport stage includes single-phase flow channel 206 and a two-phase flow channel 208. The transport stage may further include a pump 210, which can be installed in the single-phase flow channel 206 to enhance channel flow.

In one embodiment of the present invention, the single-phase flow channel 206 and the two-phase flow channel 208 can be metallic pipes to enhance rigidity and/or heat exchange such as copper piping with brazed, welded, and/or soldered connections. In an embodiment of the present invention, the diameter of the pipes may be about 3 mm. It is also envisioned that other types of pipes suitable for heat transport such as plastic, resin, a combination thereof, and the like may be utilized. Moreover, the diameter of the pipes may depend on the type of pipe and/or the fluid passing through the pipe. In one embodiment of the present invention, it is envisioned that single-phase pumped liquid cooling has higher plate to fluid resistance than heat pipe evaporative resistance.

In one embodiment of the present invention, the cooling system 200 includes a pumped liquid loop with two-phase micro-channels to achieve plate to fluid resistance of 0.05 $C\text{-}cm^2/W$. In an embodiment of the present invention, the liquid is selected from a items such as water, alcohol, glycol, an inert liquid, combinations thereof, surfactants, mixtures thereof, and the like. Surfactants are envisioned to reduce surface tension of the fluid (even in minute amounts).

In accordance with an embodiment of the present invention, the extraction stage includes an attach block 212 coupled to the single-phase flow channel 206 and a two-phase flow channel 208. The attach block 212 may be coupled to a heat-generating device 214 to extract heat from the device 214 and using the transport stage transfer the heat to the rejection stage.

In an embodiment of the present invention, the attach block 212 may be coupled to the heat-generating device 214 through a thermal interface material (TIM). In one embodiment of the present invention, the cooling system 200 is a closed system to limit effects of outside pressure change such as when a computer system is being used at the higher altitude.

In accordance with an embodiment of the present invention, it is envisioned that the techniques discussed herein may be utilized to cool heat generating components of a computer system such as the CPU, memory circuits, power supply circuits, and circuit boards (e.g., a video card). In one embodiment of the present invention, the rejection stage may be physically placed at an outer age or remote from the notebook computer to provide efficient cooling. The routing of the components of the transport stage (such as the two-phase flow channel 208 and the pump 210) may be proximate to non-heat generating devices and/or devices less susceptible to temperature changes.

Figure 3:
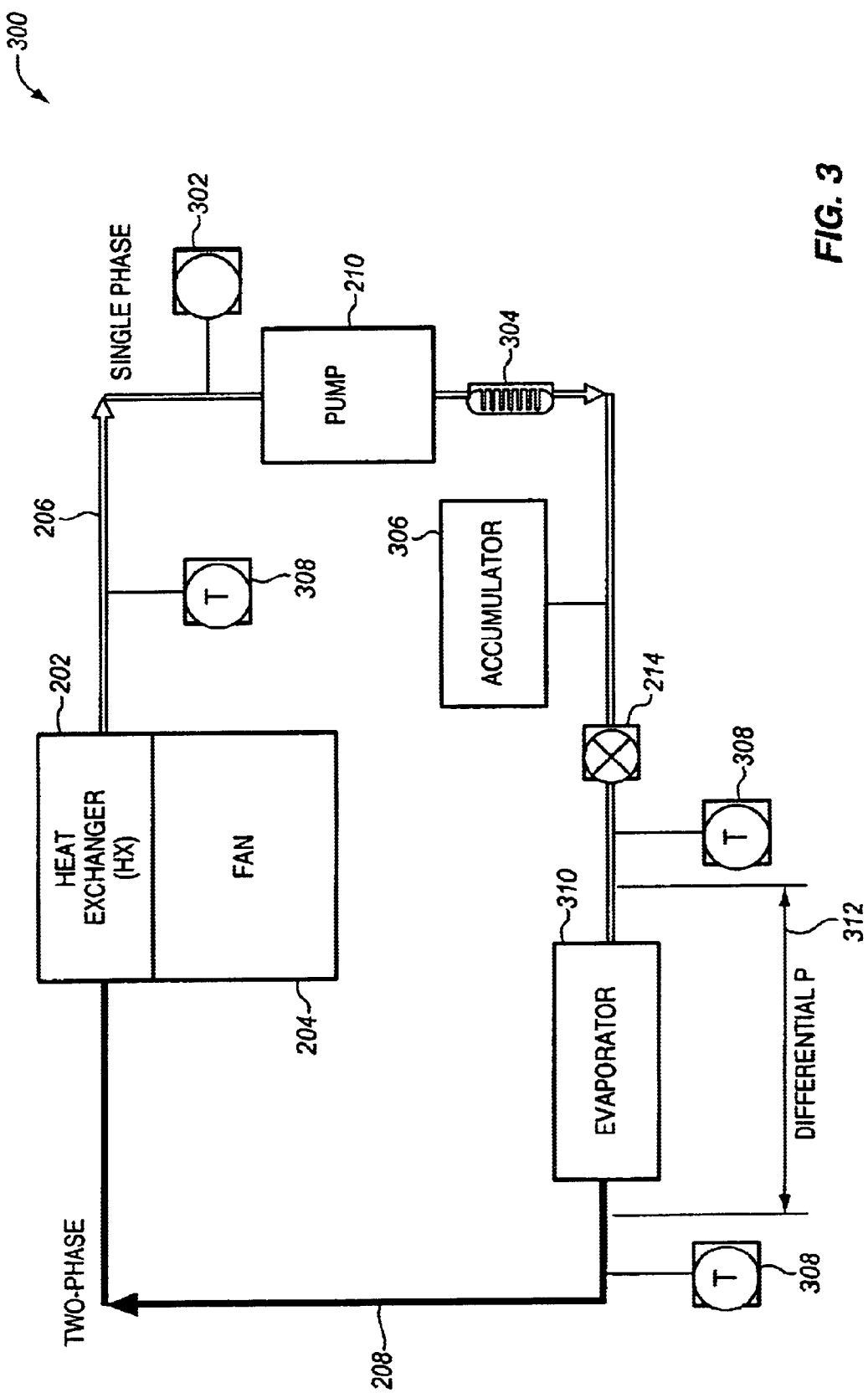
FIG. 3 illustrates an exemplary block diagram of a cooling system 300 in accordance with an embodiment of the present invention.

FIG. 3 illustrates an exemplary block diagram of a cooling system 300 in accordance with an embodiment of the present invention. In one embodiment of the present invention, the cooling system 300 may have the same or similar elements as the cooling system 200 of FIG. 2. The cooling system 300 includes the heat exchanger 202, the fan 204, the single-phase flow channel 206, the two-phase flow channel 208, the pump 210, and the heat-generating device 214.

The cooling system 300 further includes: a fill port 302 (e.g., to refill the cooling system 300 in case of fluid loss through, for example, evaporation and/or for servicing the system); a flow meter 304 (e.g., to measure fluid flow through the pump 210); an accumulator 306 (e.g., to regulate system pressure); one or more temperature probes 308 (e.g., to monitor the temperature of the cooling system 300 at various stages such as those discussed with reference to FIG. 2); and/or an evaporator or cold plate 310 (e.g., to transfer the heat generated by the device 214 away from the device 214).

In one embodiment of the present invention, the evaporator 310 is embodied in or as the attach block 212 of FIG. 2. It is envisioned that the liquid inside the cooling system 300 at least partially converts into a second phase (i.e., vapor) while extracting heat from the device 214. To enhance its functionality, in an embodiment of the present invention, the evaporator 310 has multiple parallel channels. As discussed with reference to the attach block 212, the evaporator 310 may be physically attached to heat generating device 214 (e.g., through a thermal interface material).

In one embodiment of the present invention, the flow meter 304 and the accumulator 306 may be combined into one device. In an embodiment of the present invention, the accumulator performs one or more of the following acts: regulating a system pressure, regulating an operating flow regime, regulating boiling, and accommodating changing volume in the transport medium/liquid with change in its phase, for example.

In one embodiment of the present invention, the two-phase system discussed herein uses water as working fluid and operates at about 70 degrees C. Furthermore, the system pressure may be at about 4.52 PSI nominally (or at about 0.31 Bar) with about one to two PSI difference through the channels. For example, the pressure may be at about 5 PSI at the pump 210, at about 6 PSI prior to entering the evaporator 310, and at about 4.5 PSI upon exiting the evaporator 310. In one embodiment of the present invention, it is envisioned that there may be a need for additional pressure drops at other locations to ensure flow stability (e.g., at points 308).

With respect to the pump 210, in one embodiment of the present invention, a reciprocating flow device can be utilized which may be converted into a unidirectional flow device via check-valves. Also, the control of such a pump needs a special power supply (e.g., high current, bipolar, and the like) in accordance with an embodiment of the present invention.

In an embodiment of the present invention, the evaporator 310 may be a micro/mini-channel evaporator with multiple parallel channels to, e.g., enhance area for boiling and reduce the differential pressure across the evaporator (312). In accordance with one embodiment of the present invention, the evaporator 310 is optimized to provide high area and low differential pressure to maximize the fluid temperature at the exit of the evaporator 310.

In accordance with other embodiments of the present invention, the micro/mini-channels may have any combination of the following characteristics: optimized geometry to minimize thermal resistance with the constraint of a given pump curve; sized about 0.25 mm to 0.5 mm apart; about 0.25 mm (width)×1 mm (deep)×15 mm long; about 100 micron to 300 micron in width; about 500 to 1000 micron in height; have any shape such as square, triangular, and the like; constructed with material such as copper, silicon, combinations thereof, etc.; and/or coating for boiling enhancement.

In an embodiment of the present invention, the heat exchanger 202 has a tube diameter of about 6 mm to ensure condensation (or relatively lower differential pressure). In an embodiment of the present invention, the heat exchanger operation is improved by increasing the tube diameter to increase surface area and ensure condensation, and reduce pressure drop. In accordance with one embodiment of the present invention, available fin volume is about 60 mm wide, 20 mm flow length, and 17 mm high. Additionally, the heat exchanger may have surface enhancement internally to enhance condensation.

In one embodiment of the present invention, the fan 204 is about 60 mm×60 mm×14 mm, with a fan curve (end points) of Qmax at about 4.8 CFM, ΔPmax at about 0.4 PSI, resulting in θhx-a of about 0.65 C/W (with 20% system cooling burden, θhx-a of about 0.81 C/W).

Figure 4:
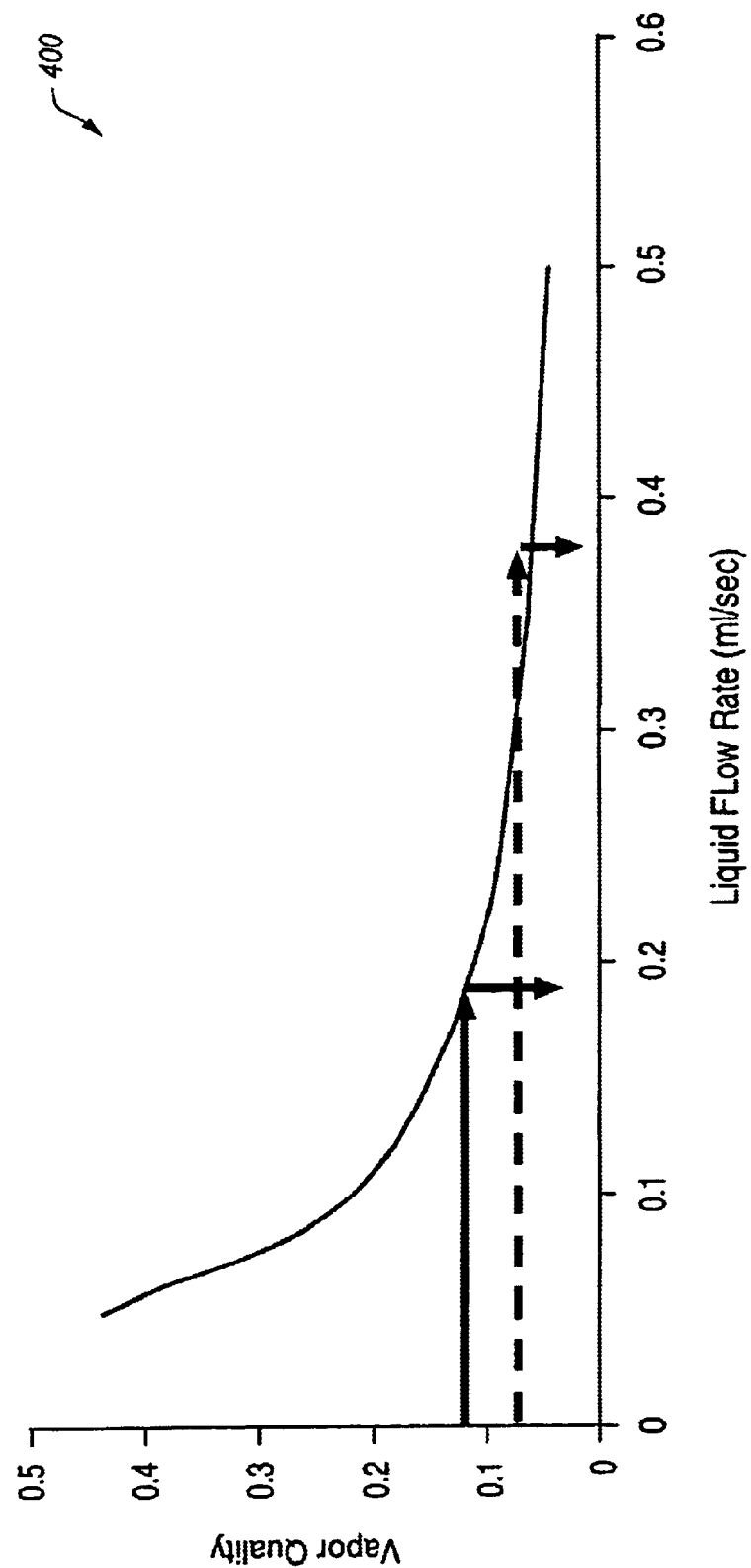
FIG. 4 illustrates an exemplary graph 400 of vapor quality versus liquid flow rate (at about 70 degrees C.) in accordance with an embodiment of the present invention.

FIG. 4 illustrates an exemplary graph 400 of vapor quality versus liquid flow rate (at about 70 degrees C.) in accordance with an embodiment of the present invention. In an embodiment of the present invention, the flow rate of the pump 210 discussed with reference to FIGS. 2 and 3 is about 0.25 mL/sec (e.g., for a quality of about 10% o). As illustrated in FIG. 4, the flow rate of the pump 210 may be maintained above about 0.50 mL/sec to ensure higher vapor quality (e.g. better than 5%).

Figure 5:
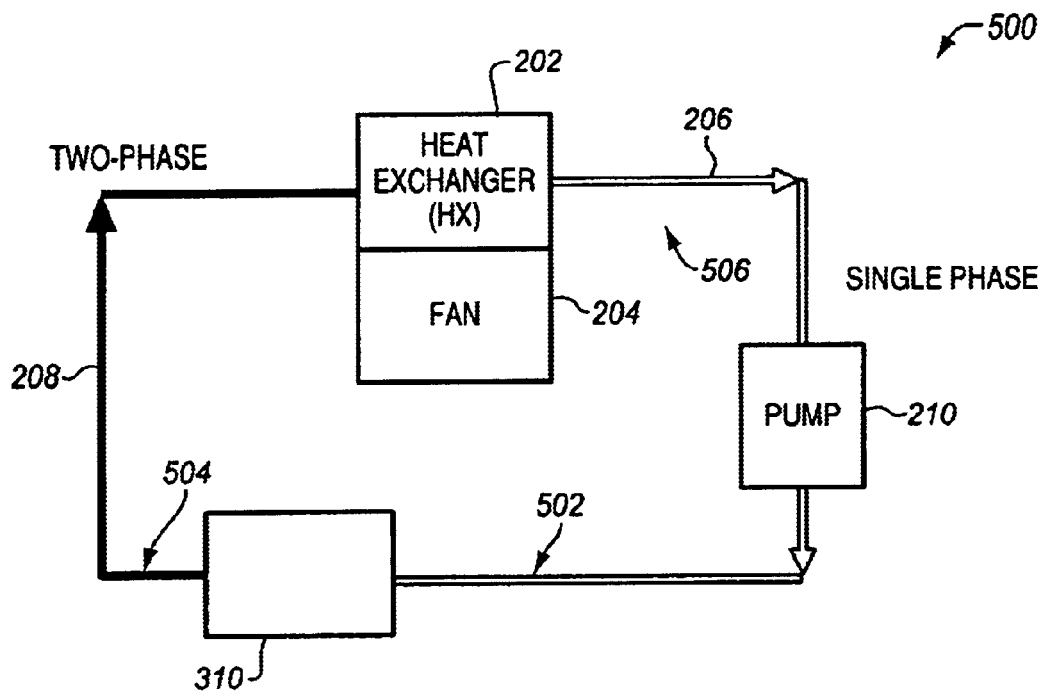
FIG. 5 illustrates a simplified block diagram of a cooling system 500 in accordance with an embodiment of the present invention.

FIG. 5 illustrates a simplified block diagram of a cooling system 500 in accordance with an embodiment of the present invention. In one embodiment of the present invention, the cooling system 500 may have the same or similar elements as the systems (200 and 300) discussed with respect to FIGS. 2 and 3, respectively. The cooling system 500 includes the heat exchanger 202, the fan 204, the single-phase flow channel 206, the two-phase flow channel 208, the pump 210, and the evaporator 310. The cooling system 500 further identifies three regions (502, 504, and 506), which will be further detailed with reference to FIG. 6 below.

Figure 6:
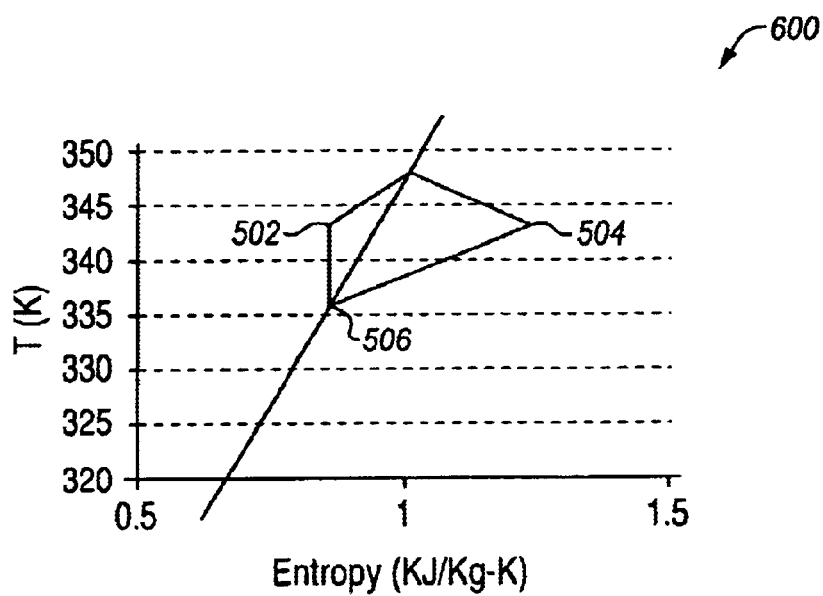
FIG. 6 illustrates an exemplary graph 600 indicating the thermodynamic characteristics of certain regions of the cooling system 500 of FIG. 5 in accordance with an embodiment of the present invention.

FIG. 6 illustrates an exemplary graph 600 indicating the thermodynamic characteristics of certain regions of the cooling system 500 of FIG. 5 in accordance with an embodiment of the present invention. The graph 600 identifies the entropy of the cooling system 500 of FIG. 5 at regions 502, 504, and 506 in accordance with an embodiment of the present invention as a plot of entropy (KJ/Kg-K) versus temperature (in Kelvin).

In accordance with one embodiment of the present invention, the techniques discussed herein are envisioned to provide better performance, reliability, and safety. In an embodiment of the present invention, the pump forces the fluid to go through the evaporator (mini or micro-channels). The working fluid changes phase and at the exit of the evaporator/cold plate has a mixture of the liquid and its vapor. This fluid mixture enters the condenser (at the heat exchanger), which changes the vapor phase fluid back to liquid, thus ensuring that the pump is pumping single-phase fluid back to the device being cooled.

Figure 7:
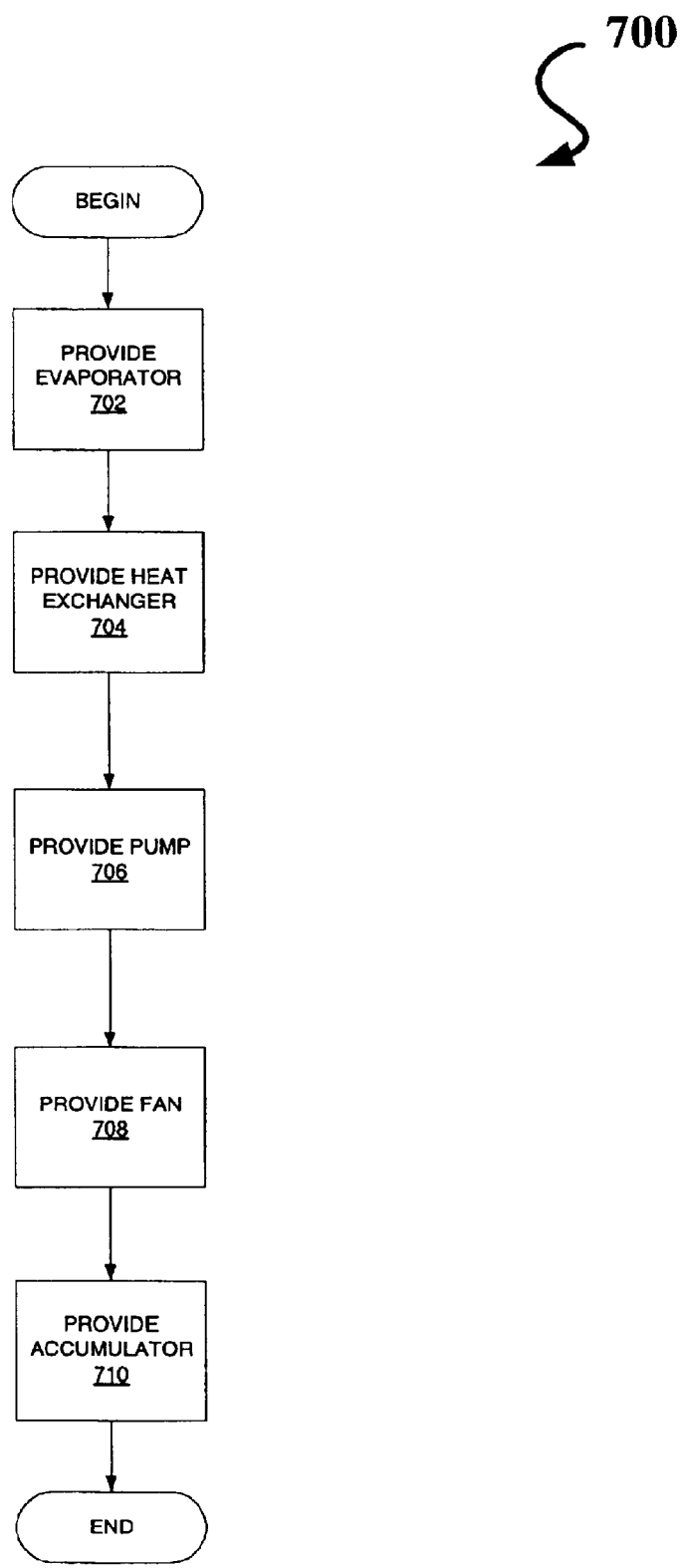
FIG. 7 illustrates an exemplary cooling method 700 in accordance with an embodiment of the present invention.

FIG. 7 illustrates an exemplary cooling method 700 in accordance with an embodiment of the present invention. The method 700 starts in a stage 702, which provides an evaporator. In one embodiment of the present invention, the evaporator may be inside a notebook computer. The notebook computer may have a heat-generating device (such as a CPU). And, the evaporator may be coupled to the heat-generating device to remove heat therefrom. A stage 704 provides a heat exchanger. The heat exchanger may be coupled to the evaporator of the stage 702. In a stage 706, the method 700 provides a pump to pump a transport medium through, for example, the evaporator and the heat exchanger to transfer the generated heat from the heat-generating device to the heat exchanger.

In an embodiment of the present invention, the heat-generating device may be a CPU, a memory circuit, a power supply circuit, and/or a circuit board. The transport medium may be a liquid such as water, alcohol, glycol, an inert liquid, surfactants, or mixtures thereof. The evaporator may have multiple parallel channels. In an embodiment of the present invention, the method 700 may optionally further include providing a fan proximate to the heat exchanger to enhance airflow across the heat exchanger (708). In one embodiment of the present invention, the method 700 may further optionally include providing an accumulator coupled between the pump and the evaporator to perform one or more acts such as regulating a system pressure, regulating an operating flow regime, regulating boiling, and accommodating changing volume in the transport medium with change in phase (710).

Whereas many alterations and modifications of the present invention will no doubt become apparent to a person of ordinary skill in the art after having read the foregoing description, it is to be understood that any particular embodiment shown and described by way of illustration is in no way intended to be considered limiting.

For example, the techniques described herein may be equally beneficial in other mobile devices such as portable moving picture experts group layer-3 audio (MP3) players, personal digital assistants (PDAs), pocket personal computers (PCs), cell phones, pagers (e.g., two-way pagers), and the like. Therefore, references to details of various embodiments are not intended to limit the scope of the claims which in themselves recite only those features regarded as essential to the invention.

What is claimed is:

1. A notebook computer comprising:
    a central processing unit (CPU);
    a display device coupled to the CPU to display an image;
    an evaporator coupled to the CPU to extract heat generated by the CPU;
    a heat exchanger coupled to the evaporator;
    a transport medium to flow inside the evaporator and the heat exchanger to transfer the generated heat from the CPU to the heat exchanger; and
    a pump attached to the evaporator and the heat exchanger to force the transport medium between the evaporator and the heat exchanger.

2. The notebook of claim 1 further including a main memory coupled to the CPU.

3. The notebook of claim 1 further including a memory coupled to the display device to store the image.

4. The notebook of claim 1 wherein the evaporator is coupled to the CPU through a thermal interface material.

5. The notebook of claim 1 wherein the transport medium is a liquid selected from a group comprising water, alcohol, glycol, an inert liquid, surfactants, and mixtures thereof.

6. The notebook of claim 1 wherein the transport medium is capable of changing phase inside the evaporator.

7. The notebook of claim 1 wherein the evaporator has multiple parallel channels.

8. The notebook of claim 1 wherein the evaporator is constructed with material selected from a group comprising copper, silicon, and combinations thereof.

9. The notebook of claim 1 wherein the heat exchanger is located remote from the CPU.

10. The notebook of claim 1 further including a fan proximate to the heat exchanger to enhance airflow across the heat exchanger.

11. The notebook of claim 1 further including an accumulator coupled between the pump and the evaporator to perform one or more acts selected from a group comprising regulating a system pressure, regulating an operating flow regime, regulating boiling, and accommodating changing volume in the transport medium with change in phase.

12. The notebook of claim 7 wherein the multiple channels are one or more of mini-channels and micro-channels.

13. A cooling apparatus comprising:
    an evaporator coupled to a heat generating device to extract the generated heat away from the device, the device being installed inside a notebook computer;
    a heat exchanger coupled to the evaporator;
    a transport medium to flow inside the evaporator and the heat exchanger to transfer the generated heat from the device to the heat exchanger; and
    a pump attached to the evaporator and the heat exchanger to force the transport medium between the evaporator and the heat exchanger.

14. The apparatus of claim 13 wherein the heat-generating device is selected from a group comprising a CPU, a memory circuit, a power supply circuit, and a circuit board.

15. The apparatus of claim 13 wherein the evaporator is coupled to the device through a thermal interface material.

16. The apparatus of claim 13 wherein the transport medium is a liquid selected from a group comprising water, alcohol, glycol, an inert liquid, surfactants, and mixtures thereof.

17. The apparatus of claim 13 wherein the transport medium changes phase inside the evaporator.

18. The apparatus of claim 13 wherein the evaporator has multiple parallel channels.

19. The apparatus of claim 13 wherein the evaporator has surface treatment to enhance boiling characteristics.

20. The apparatus of claim 13 wherein the evaporator is constructed with material selected from a group comprising copper, silicon, and combinations thereof.

21. The apparatus of claim 13 wherein the heat exchanger is located remote from the device.

22. The apparatus of claim 13 further including a fan proximate to the heat exchanger to enhance airflow across the heat exchanger.

23. The apparatus of claim 13 wherein the heat exchanger has surface enhancement internally to enhance condensation.

24. The apparatus of claim 13 further including an accumulator coupled between the pump and the evaporator to perform one or more acts selected from a group comprising regulating a system pressure, regulating an operating flow regime, regulating boiling, and accommodating changing volume in the transport medium with change in phase.

25. A cooling method comprising:
    providing an evaporator inside a notebook computer coupled to a heat generating device;
    providing a heat exchanger coupled to the evaporator;
    providing a pump to pump a transport medium through the evaporator and the heat exchanger to transfer the generated heat from the device to the heat exchanger.

26. The method of claim 25 wherein the heat-generating device is selected from a group comprising a CPU, a memory circuit, a power supply circuit, and a circuit board.

27. The method of claim 25 wherein the transport medium is a liquid selected from a group comprising water, alcohol, glycol, an inert liquid, surfactants, and mixtures thereof.

28. The method of claim 25 wherein the evaporator has multiple parallel channels.

29. The method of claim 25 further including providing a fan proximate to the heat exchanger to enhance airflow across the heat exchanger.

30. The method of claim 25 further including providing an accumulator coupled between the pump and the evaporator to perform one or more acts selected from a group comprising regulating a system pressure, regulating an operating flow regime, regulating boiling, and accommodating changing volume in the transport medium with change in phase.

* * * * *